United States Patent Office 3,565,711
Patented Feb. 23, 1971

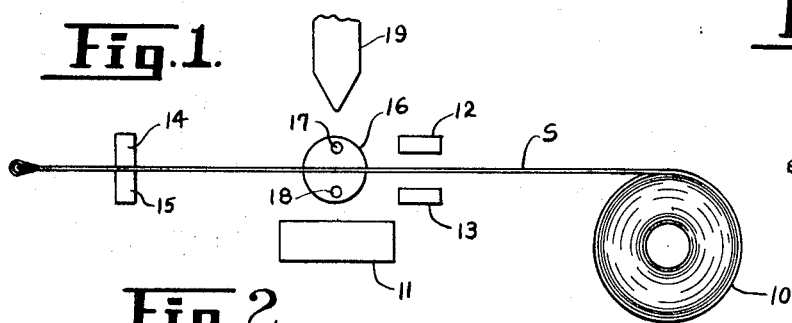
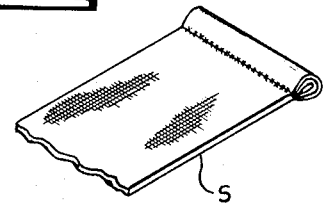
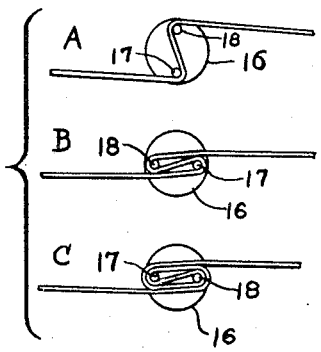
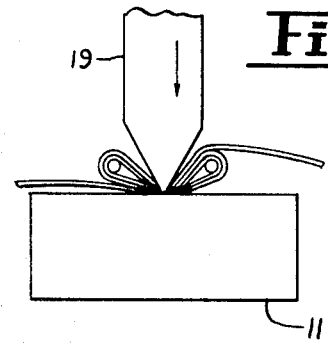
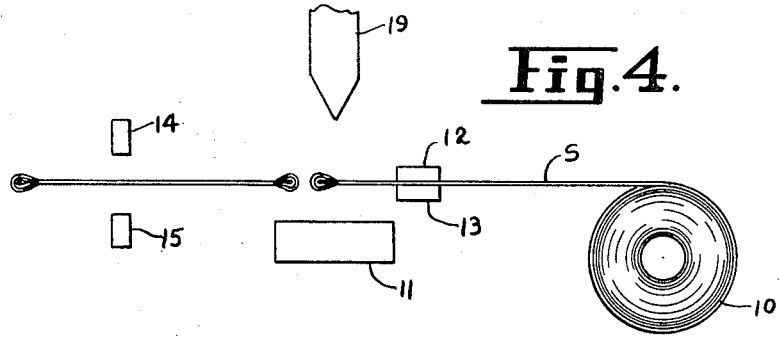
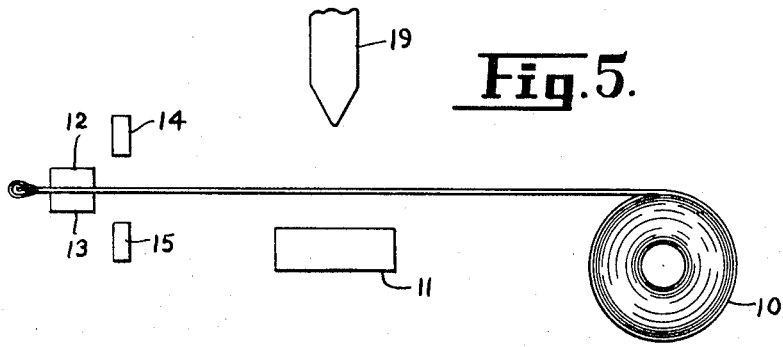
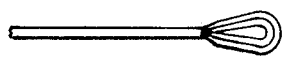

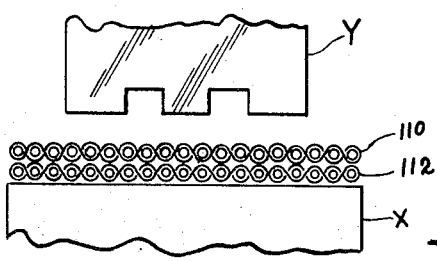
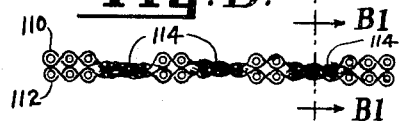
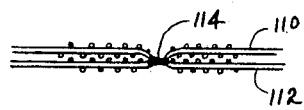
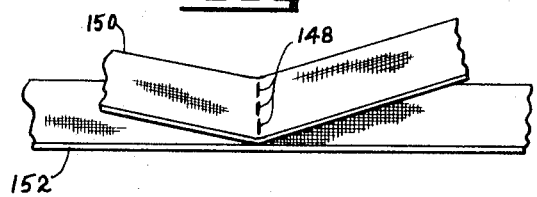
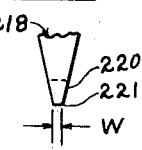
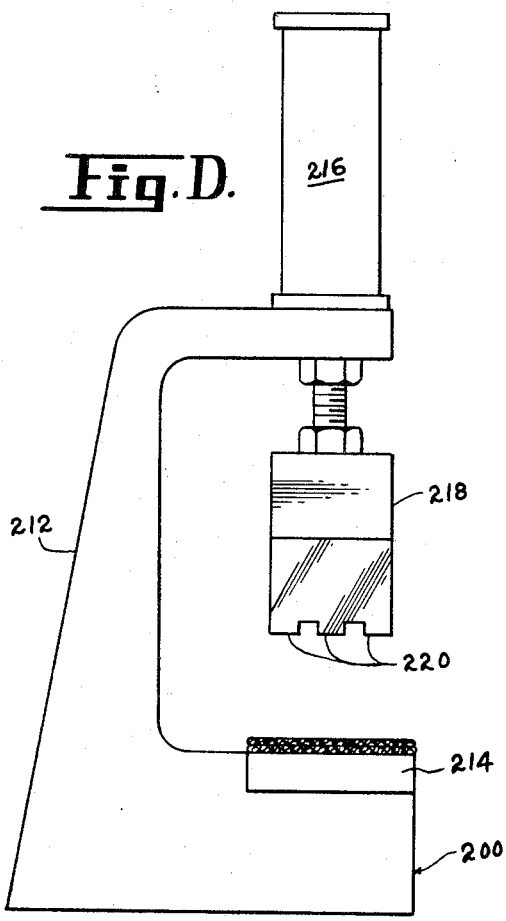
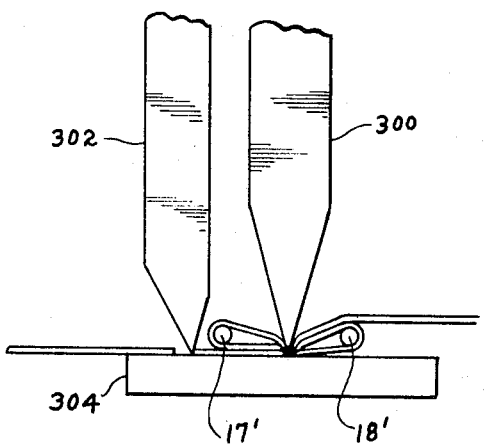

3,565,711
PROCESS FOR JOINING LAYERS OF A WOVEN POLYAMIDIC MATERIAL AND FOR TIPPING THE ENDS OF A STRIP OF SUCH MATERIAL
Charles Block, North Bellmore, and Leon J. Mintz, Syosset, N.Y., assignors to Undergarment Assemblies, Inc., Copiague, N.Y., a corporation of New York
Continuation-in-part of application Ser. No. 476,502, Aug. 2, 1965. This application May 12, 1967, Ser. No. 696,664
Int. Cl. B29c 27/08
U.S. Cl. 156—73     3 Claims

ABSTRACT OF THE DISCLOSURE

Superposed plies of woven polyamide-containing material are placed on a rigid anvil and are struck by a blunt tool in one or more localized areas to bond together the plies in those areas. A tipping operation uses this invention to form a tip on a strap of woven polyamide-containing material.

This patent application is a continuation-in-part of our patent application Ser. No. 476,502, filed Aug. 2, 1965, now abandoned.

This invention relates to the joining of layers of woven thermoplastic material wherein the plastic is a polyamide, such as nylon. The invention has specific application for instance, to an improved process in tipping the ends of ribbons woven of threads of a polyamide, such as nylon.

In the joining of layers of woven plastic thread, such as nylon, in the past it has been customary to sew a joining thread through the layers. This process has been slow and it has required complicated sewing machinery and the use of a specially chosen thread. Alternatively, in the joining of such layers in, for instance, the tipping of ends on slip straps, metal clips have been applied to the layers to be joined. This alternative has likewise been slow as it required additional machinery and required inventory of such special clips.

We have discovered completely contrary to expectations from past experience with other plastic materials, that it is possible to create a bond between woven layers of a polyamide, such as nylon, by simply hitting the layers supported on a anvil with a blunt chisel-like tool. Such a bond has sufficient strength to hold the layers together where relatively small tension forces are normally applied.

The present bonding is totally inconsistent with past experience on other plastic woven material. Its discovery was wholly unexpected. It would have been expected that the impact of the tool on the layers of nylon, for instance, might create a loose mechanical interlock as, for instance, when two layers of paper are pierced by a pointed instrument to cause an interfitting of parts on the two sheets. The present bond, however, apparently combines some of the same interfitting with a fusion which is difficult to understand, particularly since no heat is applied to the tool and the frequency of impacts would not be expected to develop enough heat in the tool to be significant.

The discovery we have made has application in as many areas as there is a need for joining woven webs of nylon or the like in a bond that will provide holding power. A good example of an application of the invention as already mentioned, is in the assembly of slip and brassiere shoulder straps or garter straps from nylon woven tapes or ribbons. In such an assembly operation, it is desirable to provide a tip or bump on the end of a strip of cloth or ribbon to provide gripping or restraining means in subsequent operation.

By way of background, in the Alfandre Pat. 2,289,472, there is disclosed a method of providing such tipped ends which consists of rolling up the ends of the ribbon and stitching across such folded ends. The application of the present invention provides a much less troublesome and faster way of producing such tips. It may result in a length of ribbon with tips at both ends, and of course, if the final use calls for only one end to be tipped, then the other may be cut off.

In the assembly of such straps, a portion of the ribbon is folded to provide a plurality of layers and these layers are cut through, and the adjacent cut edges are simultaneously fused together across the full width of the ribbon. Thus, in one step, the securing of the folds and severing of the ribbon are accomplished.

In slip strap assembly, the invention is also applicaable to the bond in which layers of the loop which attach the single link buckle to the slip are attached together temporarily prior to being sewn to the garment.

An object of the invention, therefore, is to provide a bond for securing together a plurality of plies or layers of material woven at least partly from threads of polyamide material, such as nylon.

A further object of the invention is to provide a method employing such a bond in the assembly of slip straps or the like, and particularly in the tipping of the ends of such straps.

Other objects of the invention will be apparent upon reading the following description, including the drawings, wherein:

FIG. A is a perspective view of a plurality of layers of tapes on which the invention is being practiced.
FIG. B is an enlarged sectional view of a bond formed in accordance with the invention.
FIG. B1 is a section on the line B1—B1 of FIG. B.
FIG. C is a perspective view of two tapes bonded in accordance with the invention.
FIG. D is a simplified side view of an apparatus by which the invention may be practiced.
FIG. E is a front fragmentary view of the end of a punch element by which the invention may be practiced.
FIG. F is a front view of a combined fusing and cutting apparatus by which the invention may be practiced.
FIG. 1 is a diagrammatic view of the ribbon and device for performing our improved method.
FIG. 2 indicates various stages in the folding of the ribbon.
FIG. 3 shows the simultaneous fusing and severing on a larger scale.
FIG. 4 shows the parts in position where the operation has been completed.
FIG. 5 shows the step of advancing the tape for the next succeeding operation.
FIG. 6 is a perspective view of the finished product.
FIG. 7 is a side view on an enlarged scale showing the finished tipped end of ribbon made according to our improved process of manufacture.

Referring more specifically to the drawings, FIG. A shows a preferred version of the practice of the invention. In this practice, two layers of nylon tape 110–112 are superposed on an anvil X. They are then struck simultaneously in a plurality of localized areas by preferably a blunt chisel-like tool Y having a flat end (FIG. E). The tool Y is formed with a plurality of spaced teeth to result in spaced nonimpacted areas on the product to avoid any risk of severing the layers of material.

As shown in FIG. B, after striking, the layers 110 and 112 of the material are compacted in areas 114 which have been struck by the tool Y. Close examination reveals that in these areas, the filaments comprising the threads of the layers 110 and 112 are crushed. There appears further to be some kind of a fusing action but there is otherwise no appearance of heat, such as scorching. Exactly what creates the bond is not clear. There is apparently an integration of the nylon material, which is apparently a combination of a mechanical interlock and a fusion enhanced to some extent perhaps by some intermolecular bonding of molecules of contiguous filaments. As indicated, the punch is provided with no source of heat and any heat connected with the process is that generated on impact with the nylon resting on the anvil. After continuous operation, the point of the punch is not warm to the touch.

Tests have shown that the presence of a polyamide, such as nylon, is a necessary requisite to the effective practice of the invention. The greatest bonding strength is achieved when threads of such material run perpendicular to the bond line. Threads of other composition, such as Dacron, may be used in the weave direction parallel to the line of bond without significant impairment to the bond.

Referring now to the apparatus by which the invention may be accomplished, FIG. D generally designates a press 200 comprising a simple C-shaped frame 212 having a hardened anvil surface 214. Stationed above the anvil surface is motor means 216 capable of rapidly reciprocating a hardened punch element 218. In the FIG. D form, the motor means is an air piston cylinder combination connected to a "fast-acting" type air valve. In other apparatus the motor means may be an electric solenoid which can be powered by high energy discharge of a condenser which is charged between impacts.

As shown, the punch may present a series of spaced teeth 220. The teeth preferably have flat tips (FIG. E) and are not sharpened for the simple reason that sharp teeth would make an obvious hole or completely sever the layers of material to be bonded in the areas of impact. In addition, the material would catch on punch and be lifted as the punch raises. In this connection, it should be noted that a medium should be achieved between a blunt and a sharpened punch. The punch should not be so sharp as to sever the material as discussed, but should not be flat or so blunt that the impact impression is of any substantial width as to make it unsightly. Preferably, the thickness W of the tip (FIG. E) is on the order of 0.030". The edges at 221 are stoned to avoid sharp corners which may catch on the material being worked on.

To illustrate the effectiveness of the operation in accordance with the invention, two sections of nylon tape layers, each measuring approximately ⅝" in width and of the type used on ladies' slip straps were superposed on the hardened anvil of a press such as shown in FIG. D. The tape material was composed of threads of similar material in both weaving directions, each thread being composed of a bundle of mono-filaments of nylon. The threads were of lesser weight in the direction longitudinal of the tape: 70 denier (a 17-filament thread) as compared with 200 denier (a 34-filament thread) in the bundles in the transverse direction. There were 150 ends to the inch in the warp and 64 ends to the inch in the weft.

The nylon filament of the tape was of the type known as nylon 6/6, a reaction product of adipic acid and hexamethylenediamine. Other nylons, as well as other polyamides are useful in the practice of the invention, but nylon 6/6 is preferred.

The hardened punch 218 was brought down upon the superposed tapes with a substantial force. It was powered by a solenoid which was energized from the periodic discharge of a condenser. The punch was provided with six teeth, each about .08 inch wide and spaced apart about 0.025 inch from adjacent teeth. The teeth on their distal ends were 0.030" thick. After one blow, the punch was raised and the two layers (as in FIG. C) of material removed. Two layers on the same side of the bond 148 were spread apart and subjected to tension as from points 150 and 152 (FIG. C). Before parting at the bond, the bond withstood a peeling force of 7½ pounds. Repeated tests showed substantially similar results. After laundering in a conventional home washer, the bond strength of a similar sample was only slightly less (e.g., 6½ pounds). Calculations of the energy imparted to impacted areas of the tape as described above indicate that to achieve an effective bond at least about one inch-pound per seal must be applied. Each seal (or tooth) as indicated measured 0.08 inch by 0.03 inch.

To demonstrate the uniqueness of the invention, similar tests were made on tapes of substantially equal physical characteristics but composed of acetate threads and of Dacron threads, respectively. The strength of either of these bonds was not sufficient to be measurable. These bonds appeared to be a simple light mechanical interlock.

A test was also run on tapes having similar physical characteristics but in which the nylon threads ran only in the direction parallel to the bond line. This joint had no substantial strength although a bond of companion tapes in which nylon threads ran only in the direction perpendicular to the line of bond had about the same strength as with the all-nylon tapes.

Having now described the practice of bond-making in accordance with the invention, there follows a description of a specific application—namely, the tipping of the tapes in the making of slip and brassiere straps.

The strip or ribbon S is fed from a roll 10 over an anvil 11 by any suitable feeding mechanism. For this purpose, there is indicated a pair of jaws 12 and 13 which are in the open and retracted position in FIG. 1. After the strip is fed, it is held in place by clamping means, such as the clamping jaws 14 and 15 shown in the closed position in FIG. 1. At this stage, a rotating mandrel 16 has moved into position with the folding pins 17 and 18 extending across the tape.

In FIG. 2, position A shows the folding fingers turned by the mandrel 16, 180° from the position of FIG. 1; position B shows the formation of three layers after the pins are turned a further 90°, and position C shows the ribbon folded with five layers after the pins are turned a still further 180°.

At the end of the folding operation, a punch 19 as described above, with a chisel-like blunt end and a relatively flat face is brought down with a considerable force and velocity against the anvil 11. With many polyamides, including nylon this will presumably cause enough heat to be generated by friction while passing through the cloth to fuse the material of the several layers along the adjacent cut edges. In accordance with this version, the punch is continuous and does not present teeth as in the FIG. A version. There is hence a severing along the joint line. The punch 19 for this type of action may be operated by means of a solenoid or air piston as discussed.

In FIG. 4, the jaws 14–15 of the tape clamp are open and the finished piece can be ejected by an air blast or a mechanical sweep. At the same time, the feeding device will close the jaws 12–13 on the ribbon, ready to advance it to the next position shown in FIG. 5. In the meantime, the mandrel 16 will have been operated laterally to move the folding fingers 17–18 out of the way of the feeding device and as soon as the tape has been advanced to the proper position, mandrel 16 will again move forwardly to place the pins 17–18 astride the tape. As soon as the tape is fed to the position of FIG. 5, the clamping jaws 14–15 will close, the feeding device will open and retract rearwardly, return to the initial position of FIG. 1 and again move forwardly over the tape so that all parts are in position for the next succeeding operation.

As soon as the tape ends are released, they will tend to turn or flip over to the position shown in FIGS. 6–7 to provide the desired tipped end or ends to the finished ribbon. As seen in FIG. 7, particularly, the layers of material along the adjacent cut edges have been tightly compressed and fused together.

In the broader phase of the specific application of the FIGS. 1–7, it is contemplated that the cutting off and fusing may be accomplished by other types of devices; for example, high frequency dielectric electrodes, ultrasonic transducers, or a plain heated bar. However, the version described, namely, impact fusion of FIGS. A through F, is the preferred means.

In the version of the strap tipping apparatus shown in FIG. F motor means, such as a solenoid, not shown, drives two tools 300 and 302 down toward the anvil 304. Tool 300 is a sealing tool having teeth as tool 218 (FIG. D) and serves to seal the tape folded and resting on the anvil as FIG. 2C. Fingers 17′ and 18′ fold the tape as shown in the FIG. 2. Tool 302 is a knife which severs the tape adjacent the fold.

While this invention has been shown in but a limited number of forms, it is obvious to those skilled in the art that it is not so limited but is susceptible of various changes and modifications without departing from the spirit and scope of the claimed invention.

We claim:

1. A process of bonding together a relatively small number of superposed layers of woven fabric, the fabric of each layer having a substantial portion of its threads comprised of filaments of polyamidic material, the process comprising:
   (a) supporting the layers on a flat, rigid, anvil surface, and
   (b) striking the superposed layers in a series of closely spaced impact areas with a punch means having a substantial dimension extending in a bond line transversely of said threads, the bottom surface of the punch means being relatively thin and flat,
the force of the impact being sufficient to crush the threads and integrate the polyamidic material of the threads of the fabric at said localized areas struck by said punch means while leaving intact those portions of the layers outside said localized areas.

2. A process of bonding together a relatively small number of superposed layers of woven tape, the tape of each layer extending generally in the same direction as the tape of the other layers and the tape of each layer having a substantial portion of its longitudinal threads comprised of filaments of polyamidic material, the process comprising:
   (a) supporting the layers on a flat, rigid, anvil surface, and
   (b) striking the superposed layers in a plurality of localized impact areas with a punch means having spaced teeth extending with their greatest dimension generally in a bond line transversely of the tape of the layers, the bottom surfaces of the teeth being relatively thin and flat,
the force of the impact being sufficient to crush the threads and integrate the polyamidic material of the threads of the woven tape at said localized areas struck by said punch means while leaving intact those portions of the layers outside said localized areas.

3. A process as described in claim 2, including the additional step prior to steps (a) and (b), of folding the tape accordion fashion at fold lines each extending across the tape, the fold lines spaced along lengthwise of the tape whereby all of the said layers are parts of the same length of tape.

References Cited
UNITED STATES PATENTS

| | | | |
|---|---|---|---|
| 3,287,195 | 11/1966 | Piazze | 92—1.1X |
| 3,100,731 | 8/1963 | Brey | 156—157 |
| 3,131,104 | 4/1964 | Korn | 156—73 |
| 3,184,354 | 5/1965 | Strother | 156—73 |
| 3,418,185 | 12/1968 | Balamuth | 156—73 |

BENJAMIN R. PADGETT, Primary Examiner

B. H. HUNT, Assistant Examiner

U.S. Cl. X.R.

156—157, 251, 252